No. 894,105. PATENTED JULY 21, 1908.
C. BEALE & D. P. MOORE.
HYDRAULIC TURBINE VALVE OPERATING MECHANISM.
APPLICATION FILED FEB. 5, 1908.

2 SHEETS—SHEET 1.

Witnesses
G. M. Spring.
M. E. Moore.

Inventors
CARROLL BEALE
AND DAVID P. MOORE by David P. Moore
Attorney

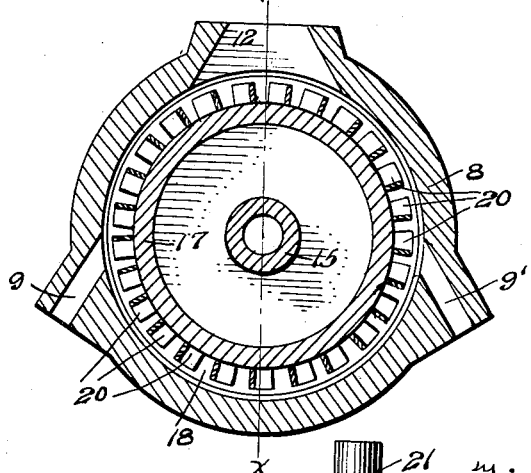
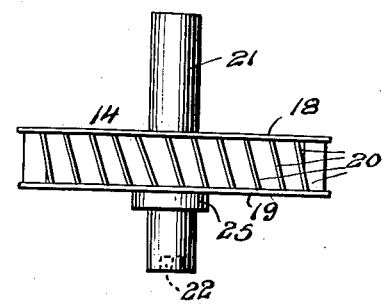
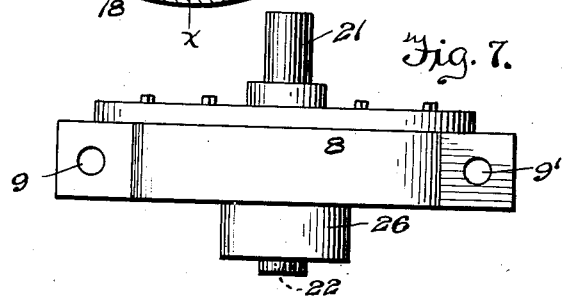
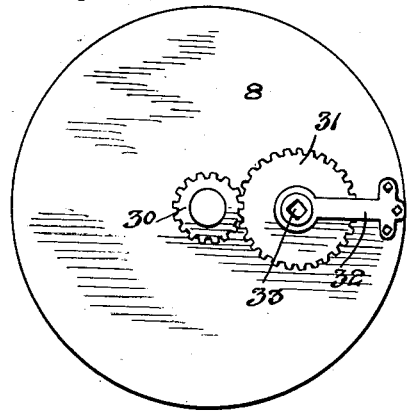
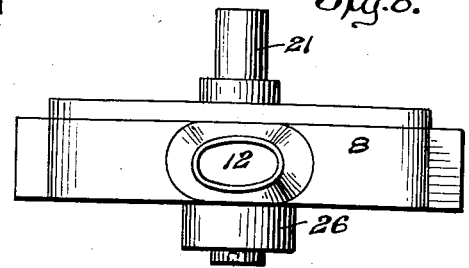
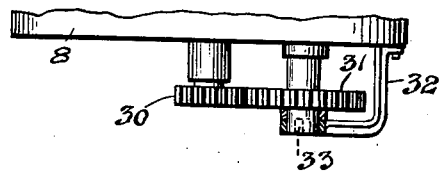

UNITED STATES PATENT OFFICE.

CARROLL BEALE AND DAVID P. MOORE, OF WASHINGTON, DISTRICT OF COLUMBIA.

HYDRAULIC TURBINE-VALVE-OPERATING MECHANISM.

No. 894,105.　　　　Specification of Letters Patent.　　　Patented July 21, 1908.

Application filed February 5, 1908. Serial No. 414,340.

*To all whom it may concern:*

Be it known that we, CARROLL BEALE and DAVID P. MOORE, citizens of the United States, residing at Washington, in the District of Columbia, have invented certain new and useful Improvements in Hydraulic Turbine-Valve-Operating Mechanism, of which the following is a specification, reference being had therein to the accompanying drawing.

Our present invention relates to improvements in hydraulic turbine valve operating mechanisms, and has special reference to a class of turbine operating mechanisms for large gate valves, as are used in the art of water distribution, said mechanism being so constructed as to employ the water pressure in the main, to either close or open the valve, and which will operate in the vault if water therein is high enough to submerge the valve and motor.

To attain these objects, we employ a reversible water turbine motor, which is operably connected to the valve casing within a vault so as to receive the pressure from the main or the valve's by-pass to operate the turbine, which in turn is operably connected to the valve closing and opening mechanism, the turbine being operated forwardly to close the valve and reversed to open the valve.

To clearly illustrate the invention, reference is had to the accompanying drawings, in which:—

Figure 1:
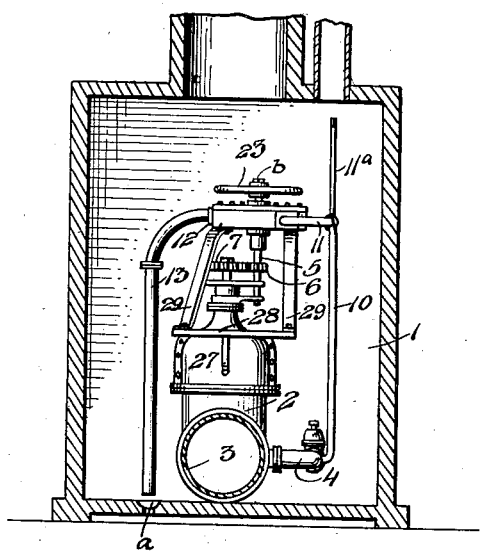
Figure 2:
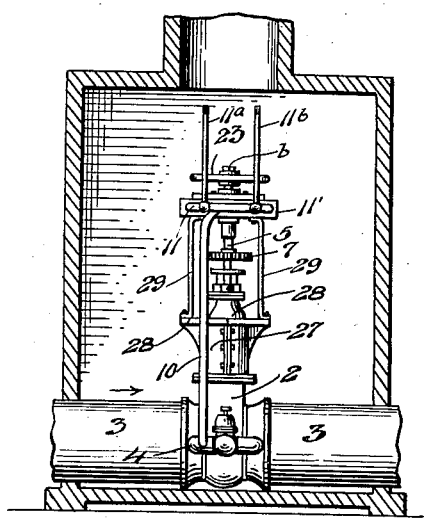
Figure 3:
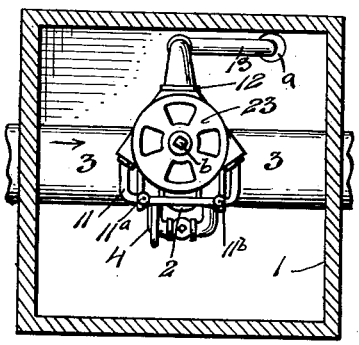
Figure 4:
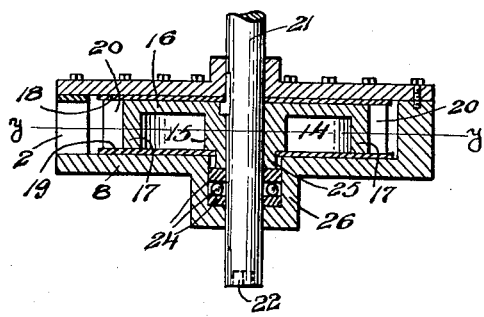

Figure 1 is a section through a vault, showing the valve and our invention in operable position. Fig. 2 is a similar view with the valve and operating mechanism in side elevation. Fig. 3 is a top plan view thereof. Fig. 4 is a vertical central section through the turbine on line $x$—$x$, Fig. 5. Fig. 5 is a horizontal section on line $y$—$y$, Fig. 4. Fig. 6 is an elevation of the turbine wheel. Fig. 7 is an elevation of the turbine, looking toward the entrance end. Fig. 8 is a similar view looking toward the discharge end. Fig. 9 is a bottom plan of the casing, illustrating a modified form of gearing. Fig. 10 is a side elevation thereof.

Referring to the drawings:—The numeral 1 designates the vault and 2, the valve, which is connected to the main 3, and is provided with the by-pass 4. These valves are commonly provided with the key shaft 5, carrying the small pinion 6, which meshes with the valve's main operating gear or pinion 7.

Our object is to construct a mechanism to operate upon the key shaft 5, and employ the water from the main or the by-pass to propel a reversible turbine or rotary water motor to open or close the valve. This mechanism, consists primarily of the turbine casing 8, having the forward nozzle 9 and the reverse nozzle 9', the pipe 10 with its branches 11 and 11', connecting these nozzles with the by-pass, in this case, so that when either one of the controlling valves 11$^a$ or 11$^b$, is operated, the water is projected into the turbine casing through the respective nozzle, and discharges through the discharge 12, and the enlarged pipe 13, where it may be conducted to either the trap $a$, or any other desired place. Mounted rotatably within the casing is the turbine wheel 14, which may be of any preferred form, as circumstances may demonstrate or require, but as here shown consists of the hub 15, having the disk 16 carrying the integral periphery 17, the said hub and periphery being incased by means of the top plate or disk 18 and the bottom plate or disk 19, as clearly shown in Figs. 4 and 6. Secured circumferentially to the periphery and between the projecting edges of the disks 18 and 19, are the blades 20, which may be perpendicular, or as shown slanting or inclining at an angle of about 10 degrees the incline being so arranged that the forward or valve closing nozzle 9, will be slightly more efficient than the reverse or valve opening nozzle 9', it requiring more force to close than open the valve. Keyed to the hub, is a shaft 21, whose lower end is provided with a shouldered socket 22, for the reception of the key shaft 5, while upon the upper end is mounted the balancing and starting or final closing wheel 23, which as inferred from its name may be used if necessary to start the valve toward closing and finally closing the same, or while when the turbine wheel is rotating acts as a balance wheel. The extreme upper end is also shouldered as at $b$ so that a key may be employed from the manhole above.

In order that the turbine wheel will rotate freely and as frictionless as possible, we provide the thrust bearing 24, interposed between the lower projecting end 25 of the hub and the thrust bearing casing 26 of the casing.

Any construction of support that may prove efficient may be employed for the turbine casing, but we prefer to employ the sectional sleeve 27, having the supporting flange 28, to which is connected the standards or legs 29, which are in turn connected to the underside of the casing, this construction being clearly shown in Figs. 1 and 2.

In the drawings, Figs. 9 and 10, we illustrate a form of gearing whereby the turbine may operate larger valves, the lower end of the shaft being provided with a small pinion or gear 30, which meshes with the large gear or pinion 31, journaled in the casing 32, and having the key-shaft receiving shouldered socket 33, whereby the key-shaft 5 is engaged. The advantages of this will be readily seen.

In order that the operator may know when the valve is fully opened or closed, a meter may be attached opposed to the balance or hand wheel, and register the revolutions, the number of revolutions to open or close the valve, having been previously ascertained, the turbine is slowed in its movement, as it approaches the desired number of revolutions, and then stopped when the desired number is reached.

From the foregoing description taken in connection with the drawings, it is evident that we provide a very simple and thoroughly practical valve closing and opening mechanism, which has all the advantages of the electric motors, and none of its disadvantages, as the power to operate our mechanism is always where needed, being the water in the main and by-pass, and as our mechanism will operate successfully even though the vault may be flooded, the various parts of the controlling mechanism being accessible either through the man-hole or the pipes located in the vault above the said parts.

What we claim, as new is:—

1. The combination with a main, a valve therefor, and a key-shaft for the valve, of a water turbine removably attached to the key-shaft from above to close and open the valve, means for conveying water from the main to the turbine to operate the turbine, and means to control the direction of projection of the water to the turbine to cause the turbine to close or open the valve.

2. The combination with a main, a valve therefor, a key-shaft for the valve, and a by-pass for the valve, of a water turbine removably attached to the key-shaft from above, and means for conveying the water from the by-pass to the turbine to operate the turbine.

3. The combination with a main, a valve therefor, a key-shaft for the valve, and a by-pass for the valve, of a water turbine removably attached to the key-shaft from above, means for conveying water from the by-pass to the turbine to operate the turbine, and means to control the direction of projection of the water to the turbine to cause the turbine to close or open the valve.

4. The combination with a main, a valve therefor, a casing for the valve, and a key-shaft for the valve, of a water turbine adapted to operate the valve, a casing for said turbine having entrance ports and a discharge port, a support for said turbine casing connected to the valve casing, a shaft for the turbine operably and removably connected to the valve's key-shaft from above, a pipe connected to the entrance ports of the turbine casing, and means for controlling said ports, whereby the turbine is rotated in either direction.

5. The combination with a vault having a manhole, a water main passing through said vault, a valve controlling said water main, and an exterior valve operating mechanism having a key-shaft, of a reversible rotary water motor adapted to pass through said manhole, said water motor being operably and removably connected from above to the key-shaft of said exterior valve operating mechanism, the shaft of the motor being provided with a key attaching end, whereby a key passed through the manhole can engage the same, and means connecting said motor with the main whereby the pressure from the main operates the motor to open or close the valve.

6. The combination with a main, a valve casing, a valve, and a key-shaft for the valve, of a reversible water motor, a support therefor, a shaft connected to the motor and projecting above and below the motor casing, the lower end operably engaging the key-shaft and the upper end being provided with a key engaging means, and means connected with the casing and the main whereby the operating fluid is directed to the motor.

7. The combination with a main, a valve casing, a valve, valve operating mechanism, and a vertical key-shaft operably connected to said mechanism, of a reversible rotary water motor mounted upon and above said key-shaft, and means for supplying pressure fluid from the main to the motor.

8. The combination with a main, a valve casing, a valve, valve operating mechanism, and a vertical key-shaft operably connected to said mechanism, of a reversible rotary water motor removably mounted upon and above said key-shaft, and means for supplying pressure fluid from the main to the motor.

9. The combination with a main, a valve casing, a valve, exterior valve operating mechanism, and a vertical key-shaft operably connected to said mechanism, of a frame supported upon the casing and extending above the key-shaft, a reversible motor carried by the frame and operably connected to the shaft, and means connected to the motor and main to supply motive power from the main to the motor.

10. The combination with a main, a valve casing, a valve, and valve operating mechanism having an exterior key-shaft, of a reversible rotary motor having its shaft extending above and below its casing, the lower end of the shaft being engaged to the key-shaft and the upper end being shouldered to receive a key, and means for conveying pressure fluid from the main to the motor.

11. The combination with a main, a valve casing, a valve, and valve operating mechanism having an exterior key-shaft, of a reversible rotary motor having its shaft extending above and below its casing, the lower end of the shaft being engaged to the key-shaft and the upper end being shouldered to receive a key, pipes leading from the main to the motor to convey motive fluid to the motor, and valves mounted in said pipes to control said motive fluid.

12. The combination with a main, a valve casing, a valve, and valve operating mechanism having an exterior key-shaft, of a reversible rotary motor having its shaft extending above and below its casing, means upon the lower end of the shaft for removably and operably engaging the key-shaft and means upon the upper end of the shaft whereby the shaft may be engaged by a key, and means for conveying pressure fluid from the main to the motor.

In testimony whereof we affix our signatures in presence of two witnesses.

CARROLL BEALE.
DAVID P. MOORE.

Witnesses:
G. M. Spring,
R. M. Parkins.